US010346953B2

(12) United States Patent
Gren et al.

(10) Patent No.: US 10,346,953 B2
(45) Date of Patent: Jul. 9, 2019

(54) FLASH AND NON-FLASH IMAGES IN FLASH ARTIFACT REMOVAL

(71) Applicant: Microsoft Technology Licensing, LLC, Redmond, WA (US)

(72) Inventors: Juuso Petteri Gren, Kyröskoski (FI); Tomi Marko Juhani Sokeila, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 15/245,163

(22) Filed: Aug. 23, 2016

(65) Prior Publication Data

US 2018/0061009 A1    Mar. 1, 2018

(51) Int. Cl.
*G06K 9/00* (2006.01)
*G06T 5/00* (2006.01)
*G06T 5/50* (2006.01)

(52) U.S. Cl.
CPC ............... *G06T 5/002* (2013.01); *G06T 5/50* (2013.01); *G06T 2207/10004* (2013.01); *G06T 2207/10152* (2013.01); *G06T 2207/20221* (2013.01); *G06T 2207/30201* (2013.01)

(58) Field of Classification Search
CPC .. G06T 5/002; G06T 5/50; G06T 2207/10004
USPC ....... 382/100, 103, 118, 117, 167, 164, 275, 382/284, 218; 396/158; 348/223.1, 348/E9.052
See application file for complete search history.

(56) References Cited

U.S. PATENT DOCUMENTS

| 6,009,209 | A | 12/1999 | Acker et al. |
| 6,728,401 | B1 | 4/2004 | Hardeberg |
| 6,801,642 | B2 | 10/2004 | Gorday et al. |
| 7,953,251 | B1 * | 5/2011 | Steinberg ............. G06K 9/0061 382/103 |
| 8,494,286 | B2 * | 7/2013 | Capata ............... G06K 9/00228 382/103 |
| 8,818,091 | B2 | 8/2014 | Zimmer |
| 8,885,074 | B2 | 11/2014 | Steinberg et al. |
| 9,083,935 | B2 * | 7/2015 | Demandolx ......... H04N 5/2354 |

(Continued)

OTHER PUBLICATIONS

Miao, et al., "Automatic Red-eye Detection and Removal", In Proceedings of IEEE International Conference on Multimedia and Expo, Jun. 27, 2004, 4 pages.*

(Continued)

*Primary Examiner* — Sheela C Chawan

(57) ABSTRACT

A computer-implemented flash artifact removal apparatus is described. The apparatus has at least a memory storing a flash image depicting a person's face captured in the presence of a flash illumination, and a non-flash image depicting the person's face captured without flash illumination. A plurality of pixels in the flash image comprise artifacts as a result of flash light reflecting from one or more eyes of the person. The apparatus has a flash artifact removal component which corrects the flash image by replacing at least some of the plurality of pixels in the flash image with pixels computed from at least the non-flash image. The flash artifact removal component is configured to detect edges of features of the one or more eyes in the non-flash image and to detect the plurality of pixels to be replaced in the flash image on the basis of the detected edges.

20 Claims, 4 Drawing Sheets

(56) References Cited

U.S. PATENT DOCUMENTS

| | | | |
|---|---|---|---|
| 9,332,210 B2 | 5/2016 | Demandolx et al. | |
| 9,659,352 B2* | 5/2017 | Ioffe | G06T 5/002 |
| 2010/0079617 A1 | 4/2010 | Kosaka | |
| 2010/0226639 A1 | 9/2010 | Thorn | |
| 2017/0272631 A1* | 9/2017 | Premutico | H04N 5/2256 |
| 2017/0344793 A1* | 11/2017 | Xue | G06K 9/52 |

OTHER PUBLICATIONS

Petschnigg, et al., "Digital Photography with Flash and No-Flash Image Pairs", In Journal of ACM Transactions on Graphics, vol. 23, Issue 3, Aug. 2004, 9 pages.

\* cited by examiner

FLASH AND NON-FLASH IMAGES IN FLASH ARTIFACT REMOVAL

BACKGROUND

Where flash photography is used to capture images of people whose faces are towards the camera, the eyes of the people are often depicted in the images as red regions and sometimes as gold or silver regions. These red/gold/silver regions are types of flash artifact. In low ambient light conditions, when flash photography is desired, human subjects typically have dilated pupils. This means that light from the flash enters the eye through the dilated pupil and reflects from the back of the eye. The amount and type of reflection results in the red, gold or silver color in the captured image. The problem tends to worsen the closer the camera flash is to the optical axis of the camera, and/or as the flash is brighter and these conditions increasingly apply in modern camera phones and other cameras.

Existing approaches involve trying to avoid red eyes occurring in the first place, for example, by using an initial flash before the image is captured in order to provoke the pupils of the human subjects to contract. Once the pupils have contracted less light from the flash is able to enter the eye.

Other existing approaches involve detecting the red/gold/silver eye regions in the captured flash image and making the color of these regions black or dark. However, this often results in an unnatural looking image where the person is depicted as if they have "holes in their eyes".

The embodiments described below are not limited to implementations which solve any or all of the disadvantages of known systems for flash artifact removal.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computer-implemented flash artifact removal apparatus is described. The apparatus has at least a memory storing a flash image depicting a person's face captured in the presence of a flash illumination, and a non-flash image depicting the person's face captured without flash illumination. A plurality of pixels in the flash image comprise artifacts as a result of flash light reflecting from one or more eyes of the person. The apparatus has a flash artifact removal component which corrects the flash image by replacing at least some of the plurality of pixels in the flash image with pixels computed from at least the non-flash image. The flash artifact removal component is configured to detect edges of features of the one or more eyes in the non-flash image and to detect the plurality of pixels to be replaced in the flash image on the basis of the detected edges.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
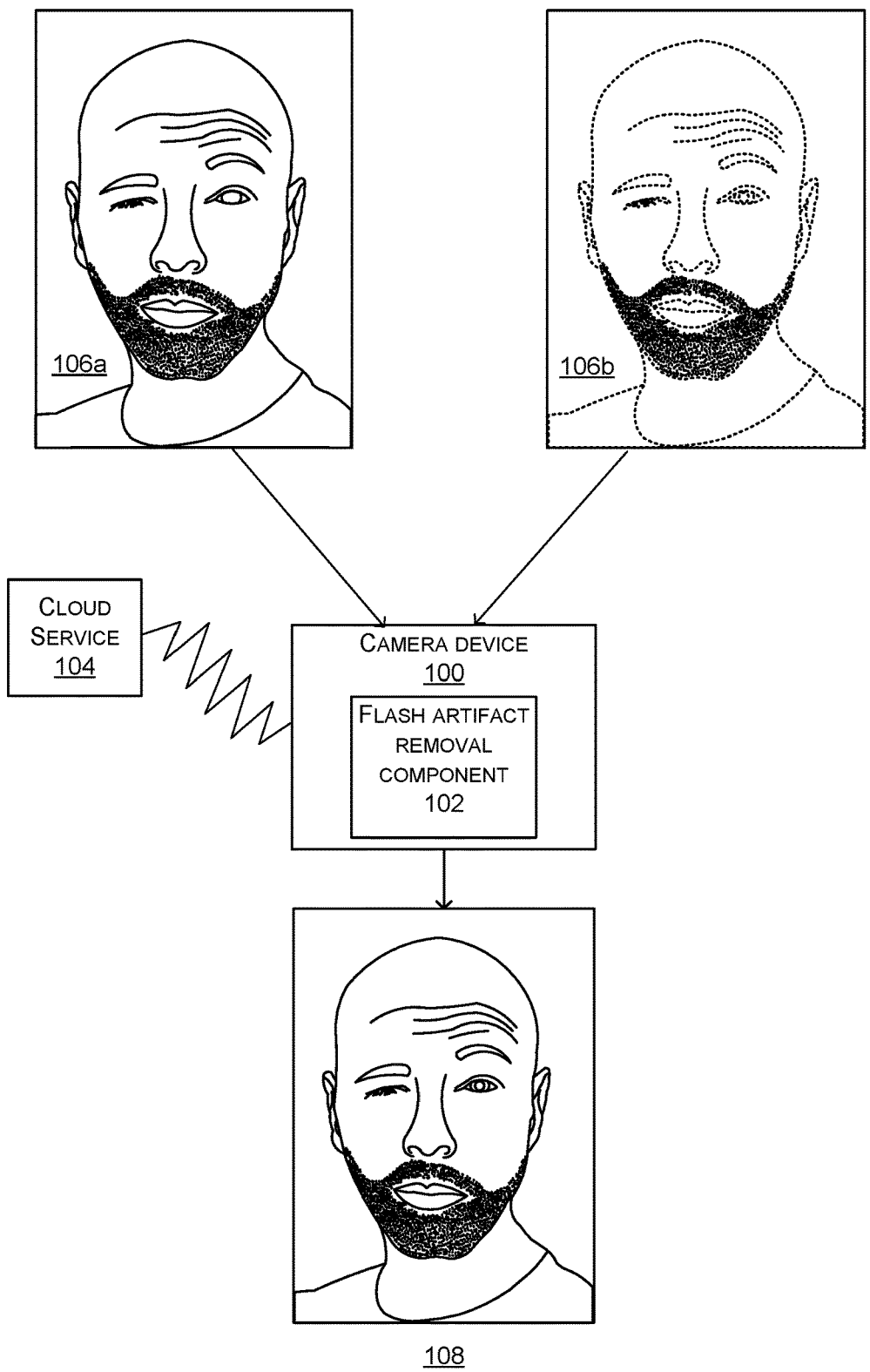
FIG. 1 is a schematic diagram of a flash image and a non-flash image captured by a camera device and used to correct red/silver/golden eye in the flash image.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Existing red eye removal methods often fail or produce unnatural looking results where the image captured under the flash illumination depicts eyes that appear at least in part silver (or white), or golden. It is recognized herein that this is because the reflection is so bright that it spreads to pixels depicting regions outside the pupil. In some cases a single eye may be depicted in part as a red region and in part as a golden/silver region due to differences in the reflected light from different parts of the back of the eye. Existing correction methods which replace the red/white/golden region by black or dark pixels then produce unnatural results. This is because some pixels are darkened even though they do not depict the pupil and the result is a "hole in the eyes" effect. The darkened pixels depicting regions outside the pupil do not depict those regions in a natural manner (for example, the iris and cornea are not black, and the eyelids are skin color). The darkened pixels depicting regions in the pupil do not depict the pupil in a natural manner either. This is because there is natural variation in an image depicting a pupil which is not present in the corrected image.

It is also recognized herein that when the image region depicting the eye is relatively small in the captured image, existing red eye removal methods often fail because it is difficult to accurately detect the pupil region as a result of its small size. For example, only a handful of pixels may be needed to represent the pupil region where the person is far from the camera. This often leads to the correction of pixels which are not depicting the pupil and so producing unnatural looking results.

Some previous approaches have detected the border of the red eye region and then darkened the pixels within that region. This produces unnatural results where the borders of the red eye region are fuzzy and extend into the iris. The pixels depicting the iris are then darkened inappropriately.

In various embodiments described herein flash artifact correction is achieved, by using information from a non-flash image depicting the eyes as well as information from the flash image (depicting the same eyes), to make a correction. A non-flash image is a digital image captured by a camera without flash illumination and a flash image is a digital image captured by a camera with flash illumination. The camera is a digital color camera such as in a camera phone, tablet computer, head mounted computer, wrist worn computer, web camera, video camera or other device. Because the non-flash image has valuable information about the eyes and the scene depicted in the images, the corrected flash image is more accurate. In some examples the non-flash image is captured by the same camera as the flash image and using bracketing so that the flash and non-flash images are captured close in time. However, it is not essential to use the same camera to capture the two images. Also, it is not essential for the images to be captured at a similar time, as long as they both depict the eye(s) and approximately the same scene. In various examples, the combination of edge detection in the non-flash image to find which pixels to correct using information from the flash image enables natural results even where golden or silver eye artifacts are present which are typically very difficult to correct well due to light reflecting from the eye spreading outside the pupil.

FIG. 1 is a schematic diagram of a flash image 106a and a non-flash image 106b captured by a camera device 100 and combined to produce an output image 108. The images are of a person facing the camera and with one eye shut and one eye open. In the flash image 106a the eyes are any combination of substantially red, substantially silver, substantially golden and this is depicted in the line drawing by showing the eye as a circle. Because the reflected light from the back of the eye spills out into regions beyond the pupil the pupil, iris, sclera and shape of the eye are not fully visible. In the non-flash image 106b the ambient light level is low and this is indicated by the use of dotted lines to indicate low intensity levels. The non-flash image 106b has detail of the pupil boundary, iris boundary, sclera and eye lid edges but this of lower confidence than it would be in a higher dynamic range image because of the low level of ambient illumination.

In this example the camera device 100 is a camera phone held by a photographer and used to take a bracket of images 106a, 106b in quick succession depicting a person with one eye shut and one eye open facing the camera. The order in which the flash and non-flash image are captured is either with the flash image first and the non-flash image second, or vice versa. Where the flash image has a shorter exposure time than the non-flash image it is captured first in some examples. This minimizes camera motion between capture of the flash and non-flash images. More than one flash image is captured in some examples and used in the methods described herein. More than one non-flash image is captured in some examples and used in the methods described herein.

The camera device 100 has a flash artifact removal component 102 implemented using any combination of software, hardware and firmware. The flash artifact removal component 102 combines information from the individual images of the bracket of images 106 to produce output image 108. The flash artifact removal component 102 optionally computes image data from either or both of the input images 106a 106b and uses that image data to guide the process of combining information from the individual images. The term "flash artifact removal component" is used to refer to a component which removes substantially red or substantially golden or substantially silver eye effects from flash images.

Approaches which use a single image for flash artifact removal perform poorly in situations such as illustrated in FIG. 1. It is recognized herein that this is because the flash image has a red/silver/golden region that extends beyond the pupil boundary and it is difficult to detect the correct pupil boundary from the flash image 106a alone. Also, even if the pupil boundary is accurately found, it is not possible to accurately correct the red/silver/golden region of the flash image using information from the flash image alone.

Alternatively, or in addition, the functionality of the flash artifact removal component 102 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In some cases, the flash artifact removal component 102 functionality is located in whole or in part at a cloud service 104 provided by one or more computing devices remote of the camera device 100 and in communication with the camera device 100 over a communications network. For example, the flash artifact removal component 102 is able to send the images 106a, 106b to the cloud service 104 and receive the output image 108 in return.

Figure 2:
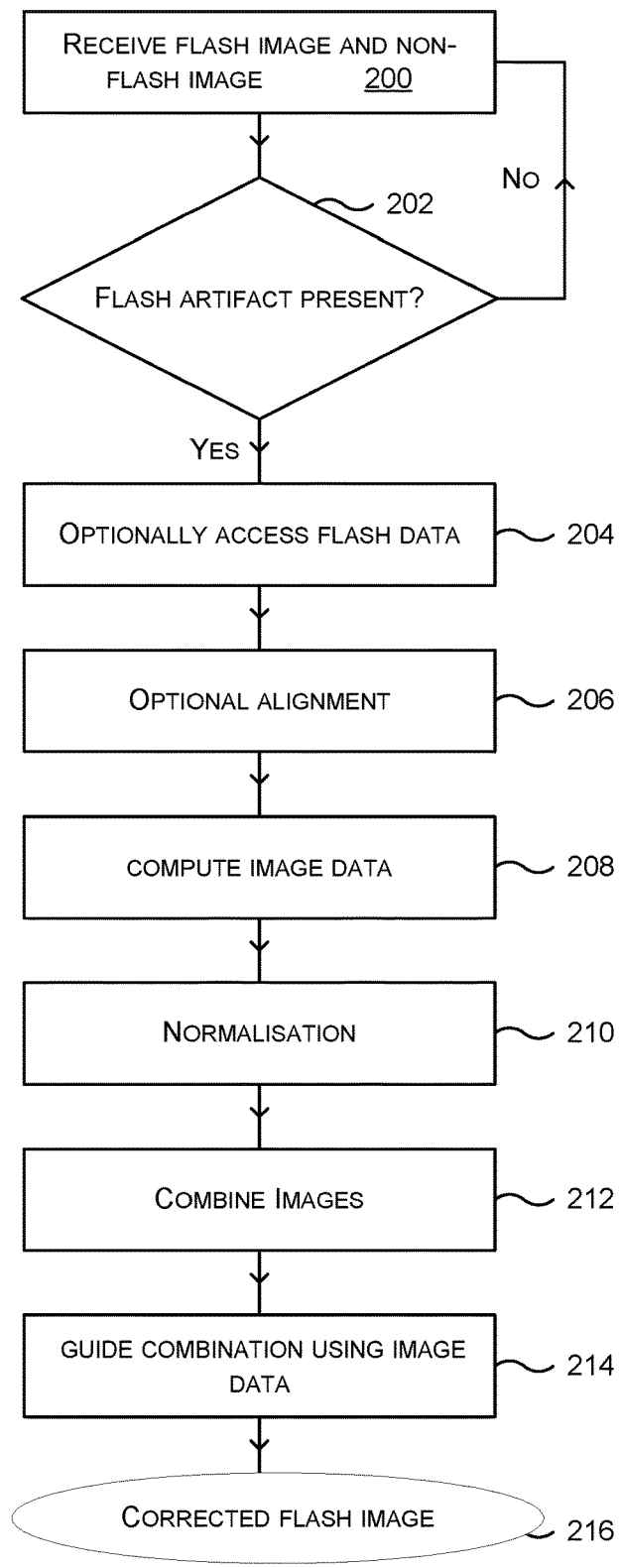
FIG. 2 is a flow diagram of a method of red/silver/golden eye correction.

FIG. 2 is a flow diagram of a method of flash artifact removal. This method is implemented by the flash artifact removal component 102 at the camera device 100 or at the cloud service 104 or shared between the camera device 100 and the cloud service 104.

A flash image and a corresponding non-flash image are received 200 such as the bracket of images 106a 106b of FIG. 1 or a pair of images from two separate cameras, or any other pair of flash/non-flash images. The flash artifact removal component 102 analyses the images to check 202 if red/golden/silver eye is present. For example, by comparing the red color channel of the flash image with the red color channel of the non-flash image. If there is a difference greater than a threshold amount then flash artifact is assumed to be present. The comparison may be done in one or more color channels. In some cases the check 202 comprises requesting user input specifying whether red/golden/silver eye is present.

If red/golden/silver eye is present the flash artifact removal component optionally accesses 204 any available metadata associated with the images such as flash power level, flash power spectrum or other camera settings used when the images were captured.

In some cases an alignment process 206 is carried out to align or register the flash and non-flash image. However, the alignment process 206 is not essential where the flash and non-flash images were captured with fast bracketing and/or where the camera used to capture the images was static and the scene was static. Aligning images is also known as image registration. For example, intensity-based image alignment is used whereby intensity patterns in the images are compared using correlation metrics. The target image is transformed iteratively using the correlation metric as a way to direct the search for a good alignment. Aligning a target image to the reference image using feature-based methods involves identifying pixels in the reference image and the image to be aligned, which depict the same feature in the scene. A geometrical transformation is computed from the corresponding pixels and used to transform the target image. In the case of flash artifact removal the alignment is particularly efficient where a flash artifact region has been detected in a flash image and is matched to an eye region found through edge detection or template matching in the non-flash image. These matching regions are then used to drive alignment of the whole images.

The flash artifact removal component computes 208 image data from one or both of the flash image and the non-flash image. For example, any combination of one or more of the following ways of computing image data is used.

In some cases the flash artifact removal component detects edges in the non-flash image and analyses the edges to detect the boundary of one or more of the pupil, the iris, the sclera, the eyelids. Any suitable edge detector is used such as a Canny edge detector or other process for detecting changes in intensity over the image. The information about the borders is useful for guiding correction of red/golden/silver eye as explained later.

In some cases the flash artifact removal component computes image data by making a noise analysis, such as computing a measure of signal to noise ratio for individual images (either the flash image or the non-flash image or both). Any measure of variance in intensity or other quality over the image is computed to assess the signal to noise ratio. This information is useful when correcting for red/golden/silver eye as variation which matches variation in the flash or non-flash image is added to the corrected image elements to give a more realistic result.

In some cases the flash artifact removal component computes image data comprising an artificial flash image from the non-flash image. This is done using knowledge of the flash spectrum and flash power level accessed at operation 204. The artificial flash image has no red/golden/silver eye effects. A difference between the artificial flash image and the flash image is computed and used to accurately locate the red/golden/silver regions to be corrected. Computing the artificial flash image is difficult to achieve robustly where the depth of the subject from the camera is unknown. However, robustness is improved by iteratively computing the artificial flash image for different flash power levels, to search for a power level which gives similar results for several different regions of the subject's face (assuming that different parts of the face are at the same distance from the camera).

The flash artifact removal component carries out normalization 210 of the flash and non-flash images. For example, the flash image is taken as a reference image and the range of intensity values in each color channel of the color flash image is computed. The intensity values of pixels in the non-flash image are then transformed so that the same range of values (as for the reference image) is present in each of the respective color channels. Other ways of normalizing the flash and non-flash images are used in some examples, for example, using histogram equalization. This involves transforming the intensities of pixels in each color channel, so that there are approximately the same number of pixels in each intensity range bin of a histogram. This is done for each color channel after mapping the color image to a color space so that changes to the hue of the image are avoided. Both the flash and non-flash image are transformed using histogram equalization, where the histogram is for intensity of pixels of the flash image. In some cases the normalization is achieved using a color balancing process to make the flash and non-flash images have as similar a color balance to one another as possible. In some examples both images are normalized. In some examples the non-flash image is normalized to match the flash image histogram with respect to a known region of interest such as a face region or eye region together with a surrounding area. In some examples, only pixels in a region of interest are used for the normalization in order to avoid a potentially dark background from disturbing the normalization.

In some cases the normalization 210 takes into account prior information such as one or more of: camera settings, sensor response, flash power, flash spectrum. By taking this information into account improved normalization is achieved.

Once the images have been normalized they are combined 212 using aggregation, averaging, blending or in other ways to produce a corrected flash image 216. For example, the combination comprises a copy and paste operation in some cases. For example, the combination comprises a blending process in some cases. The combination is guided using the image data computed at operation 208 in some examples. The resulting image is provided as an output image 216 and is stored in memory, rendered to a display or sent to another entity over a communications network.

In the case of a copy and paste operation, the image elements identified as being in a red/golden/silver eye region are replaced by image elements from the corresponding part of the normalized non-flash image. For example, the red/golden/silver eye region is found from operation 202 and/or operation 208 as part of a comparison of the flash and non-flash images, or a comparison of an artificial flash image and the flash image.

In the case of a blend operation, the blending is done using feathering or using weighting or using a mixture of feathering and weighting. In weighted blending the flash artifact removal component assesses pixels in the flash image, and checks if the red channel has a value indicating a red/golden/silver eye effect. If so, the flash artifact removal component computes one or more new intensity values for the pixel (one value per color channel) on the basis of the values at the corresponding pixel in the normalized non-flash image and the current values at the pixel and on the basis of a weight. The weight is used to control how much influence the non-flash image has on the outcome of the blending. For example the weight is obtained from the image data computed at operation 208 and is related to how confident the flash artifact removal component is that the flash image pixel depicts light reflected from the back of an eye. This level of confidence is assessed in terms of one or more of: distance of the pixel in the image from an edge of the pupil, iris or eyelid found from an edge detection process on the non-flash image as described above, difference between the pixel in the flash image and a corresponding pixel in a synthetic flash image computed from the non-flash image, difference between the pixel in the flash image and the pixel in the non-flash image in a particular color channel, user input selecting a flash artifact region.

In the case of feathering, a region detected as being a red/golden/silver eye region in the flash image is replaced by a corresponding region from the normalized non-flash image, and with the seam between the replaced region and the remainder of the image being softened by replacing some but not all of the pixels along the seam.

In some cases the process of combining the images is guided using image data computed from operation 208. For example, edges are detected of eye features such as one or more of a pupil, iris, sclera, eyelid and these features are used to guide the process of combining the images by selecting pixels within the detected eye features in the non flash image, or corresponding pixels in the flash image. In some cases this is achieved by using weighted blending as described above. In the case of copy and paste the process may be guided in terms of which pixels to copy using image data computed from operation 208. For example, pixels which are in locations near to an edge of a pupil, iris, eyelid of sclera are more likely to be copied and pasted into the flash image.

In cases where the non-flash image is used to help accurately detect the boundary of the red/golden/silver region (for example, to pixel level accuracy) the flash image may be desaturated, made black, or darkened within that region and then variation added to the intensity in that region to match a signal to noise ratio observed in the non-flash image.

The method of FIG. 2 is adapted in some examples to use more than one flash image and/or more than one non-flash image. For example, edges from one non-flash frame are computed and used to guide choice of which pixels to replace and pixels from another non-flash image are used to blend into the output image. Where two flash images are available captured with different flash powers these are used to achieve a better signal to noise ratio in some examples.

In some examples the flash artifact removal component 102 is integral with a digital camera 300 as now described with reference to FIG. 3.

A digital camera 300 comprises an image sensor 308 that receives light reflected from objects within the scene. The image sensor 308 comprises a charge-coupled device (CCD) sensor, a complementary metal-oxide-semiconductor (CMOS) sensor, for example a Photonic Mixer Device (PMD) sensor or other appropriate sensor which is arranged to detect light reflected and emitted from objects, people and surfaces within the camera range.

The camera comprises an optical system 312 that is arranged to gather and focus reflected light from the environment on to the image sensor 308. The camera comprises driver electronics 310 which control the image sensor 308 and the optical system 312. An image sensor may be shuttered on and off electronically rather than with physical shutters.

In one example the camera comprises a processor 304 and a memory 320 which stores sensor data from the image sensor 308. Where, a flash artifact removal component 120 is at the camera it comprises software stored at memory 302 and executed at processor 304 in some cases. In some examples the flash artifact removal component 102 is a field programmable gate array (FPGA) or a dedicated chip. For example, the functionality of the flash artifact removal component 102 is implemented, in whole or in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The camera 300 has a communications mechanism 320 in some examples to enable it to send the images it captures to another entity. The camera 300 has a display mechanism 322 in some examples to enable it to display the output images from the flash artifact removal component 102 at a display associated with the camera 300.

Figure 4:
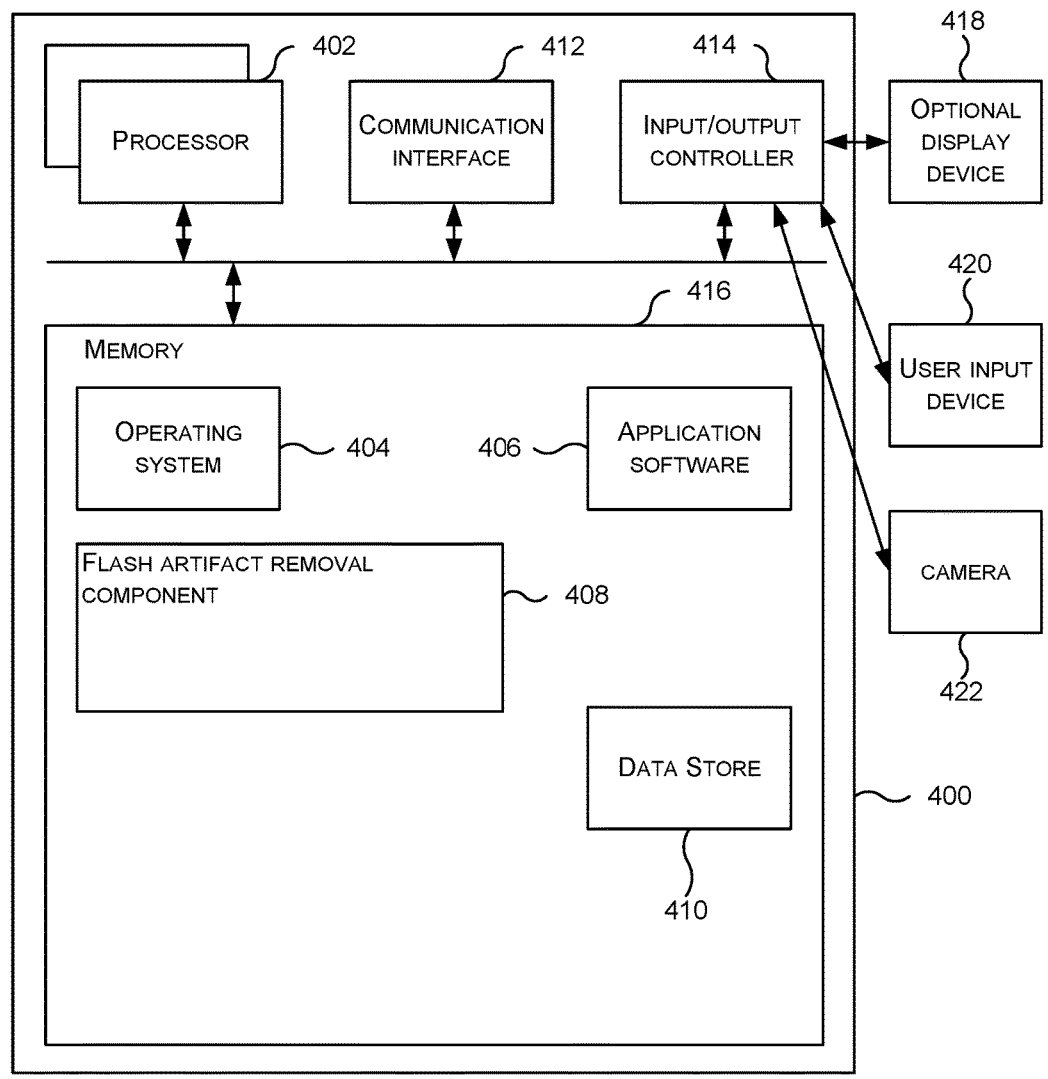
FIG. 4 illustrates an exemplary computing-based device in which embodiments of a system for red/silver/golden eye correction is implemented.

FIG. 4 illustrates various components of an exemplary computing-based device 400 which are implemented as any form of a computing and/or electronic device, and in which embodiments of an flash artifact removal component for combining aligned images are implemented in some examples.

Computing-based device 400 comprises one or more processors 402 which are microprocessors, controllers or any other suitable type of processors for processing computer executable instructions to control the operation of the device in order to carry out flash artifact removal. In some examples, for example where a system on a chip architecture is used, the processors 402 include one or more fixed function blocks (also referred to as accelerators) which implement a part of the method of FIG. 2 in hardware (rather than software or firmware). Platform software comprising an operating system 404 or any other suitable platform software is provided at the computing-based device to enable application software 406 to be executed on the device. A flash artifact removal component 408 comprising software stored in memory 416 for execution on processors 402 is available in some cases to carry out the method of FIG. 2. A data store 410 holds images, rules, image metadata, sensor data or other information.

The computer executable instructions are provided using any computer-readable media that is accessible by computing based device 400. Computer-readable media includes, for example, computer storage media such as memory 416 and communications media. Computer storage media, such as memory 416, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 416) is shown within the computing-based device 400 it will be appreciated that the storage is, in some examples, distributed or located remotely and accessed via a network or other communication link (e.g. using communication interface 412).

The computing-based device 400 also comprises an input/output controller 414 arranged to output display information to a display device 418 which may be separate from or integral to the computing-based device 400. The display information may provide a graphical user interface. The input/output controller 414 is also arranged to receive and process input from one or more devices, such as a user input device 420 (e.g. a mouse, keyboard, camera, microphone or other sensor). In some examples the user input device 420 detects voice input, user gestures or other user actions and provides a natural user interface (NUI). This user input may be used to display output images of the flash artifact removal component 408, specify rules to be used by the flash artifact removal component 408, select flash artifact regions, and select whether to carry out flash artifact removal. In an embodiment the display device 418 also acts as the user input device 420 if it is a touch sensitive display device. The input/output controller 414 outputs data to devices other than the display device in some examples, e.g. a locally connected printing device.

A camera 422 is connected to the input/output controller 414 in some examples and captures brackets of images or other pluralities of images to be combined.

Any of the input/output controller 414, display device 418 and the user input device 420 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A computer-implemented flash artifact removal apparatus comprising:

a memory storing a flash image depicting a person's face captured in the presence of a flash illumination, and a non-flash image depicting the person's face captured without flash illumination, where a plurality of pixels in the flash image comprise artifacts as a result of flash light reflecting from one or more eyes of the person; and a flash artifact removal component which corrects the flash image by replacing at least some of the plurality of pixels in the flash image with pixels computed from at least the non-flash image;

the flash artifact removal component being configured to detect edges of features of the one or more eyes in the non-flash image and to detect the plurality of pixels to be replaced in the flash image on the basis of the detected edges.

The flash artifact removal apparatus described above wherein the flash artifact removal component is configured to use the edges to detect at least part of the perimeter of any one or more of: a sclera, an eyelid, a pupil, an iris.

The flash artifact removal apparatus described above wherein the flash artifact removal component is configured to align the flash and non-flash images by aligning a region found from the detected edges with a flash artifact region detected in the flash image.

The flash artifact removal apparatus described above wherein the flash artifact removal component corrects the plurality of pixels in the flash image by replacing them with pixels copied from corresponding pixels in the non-flash image.

The flash artifact removal apparatus described above wherein the flash artifact removal component computes a seam between the replaced pixels and remaining pixels in the flash image, using feathering whereby some but not all pixels along the seam are replaced.

The flash artifact removal apparatus described above wherein the flash artifact removal component uses weighted blending with weights are computed using at least one or more of: a comparison between the flash image and a synthetic flash image computed from the non-flash image, results of the edge detection on the non-flash image.

The flash artifact removal apparatus described above wherein the flash artifact removal component computes a normalization of the non-flash image prior to correcting the flash image.

The flash artifact removal apparatus described above wherein the normalization acts to increase the similarity of the flash and non-flash images.

The flash artifact removal apparatus described above wherein the normalization comprises using a similar range of intensities in a color channel of the non-flash image as found in the flash image.

The flash artifact removal apparatus described above wherein the normalization takes into account parameters of a flash used during capture of the flash image.

The flash artifact removal apparatus described above wherein the normalization takes into account a sensor response of a camera used during capture of the flash image and the non-flash image.

The flash artifact removal apparatus described above wherein the flash artifact removal component computes a measure of signal to noise ratio of the flash image and/or the non-flash image, and wherein the flash artifact removal component adds variance to the corrected flash image on the basis of the measured signal to noise ratio.

A camera comprising the flash artifact removal apparatus described above.

A flash artifact removal apparatus comprising:

means for storing a flash image depicting a person's face captured in the presence of a flash illumination, and a non-flash image depicting the person's face captured without flash illumination, where a plurality of pixels in the flash image are substantially red, substantially silver or substantially gold as a result of flash light reflecting from one or more eyes of the person; and means for correcting the flash image by replacing at least some of the plurality of pixels in the flash image with pixels computed from at least the non-flash image;

wherein the means for correcting comprises means for detecting edges of features of the one or more eyes in the non-flash image and detecting the plurality of pixels to be replaced in the flash image on the basis of the detected edges A camera comprising the flash artifact removal apparatus described above.

A computer-implemented method comprising:

storing a flash image depicting a person's face captured in the presence of a flash illumination, and a non-flash image depicting the person's face captured without flash illumination, where a plurality of pixels in the flash image comprise artifacts as a result of flash light reflecting from one or more eyes of the person;

detecting edges of features of the one or more eyes in the non-flash image; and correcting the flash image by blending at least some of the plurality of pixels in the flash image with corresponding pixels from the non-flash image in a manner which takes into account the detected edges.

The method described above which uses weighted blending where weights computed from image data of the flash and/or non-flash image control relative influence of the flash and non-flash images on the corrected flash image.

The method described above wherein the weights are computed using at least one or more of: a comparison between the flash image and a synthetic flash image computed from the non-flash image, results of edge detection on the non-flash image.

The method described above comprising computing a normalization of the non-flash image prior to correcting the flash image.

The method described above comprising computing a measure of signal to noise ratio of the flash image and/or the non-flash image, and adding variance to the corrected flash image on the basis of the measure of signal to noise ratio.

Figure 3:
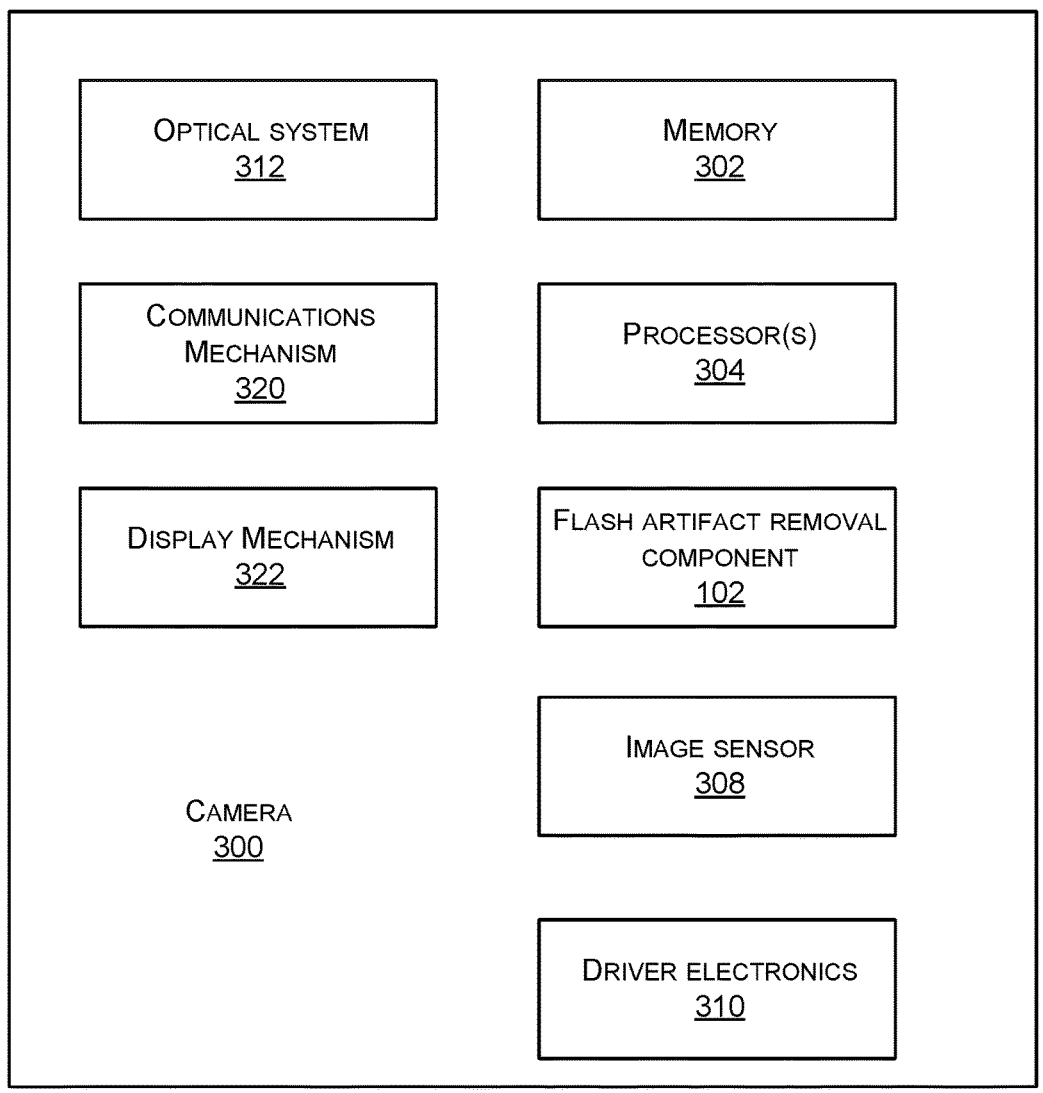
FIG. 3 is a schematic diagram of a camera suitable for red/silver/golden eye correction.

For example, the memory 302 of FIG. 3 or 416 of FIG. 4 is exemplary means for storing a flash image depicting a person's face captured in the presence of a flash illumination, and a non-flash image depicting the person's face captured without flash illumination, where a plurality of pixels in the flash image are substantially red, substantially silver or substantially gold as a result of flash light reflecting from one or more eyes of the person.

For example, the flash artifact removal component 408 of FIG. 4 is exemplary means for correcting the flash image by replacing the plurality of pixels in the flash image with pixels computed from at least the non-flash image. The flash artifact removal component 408 is exemplary means for correcting the flash image in this way when it comprises instructions implementing all or part of the method of FIG. 2 using any combination of hardware, firmware and processors 304, 402.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented flash artifact removal apparatus comprising:
   a memory storing a flash image depicting a person's face captured in the presence of a flash illumination, and a non-flash image depicting the person's face captured without flash illumination, where a plurality of pixels in the flash image comprise artifacts as a result of flash light reflecting from one or more eyes of the person; and
   a flash artifact removal component which corrects the plurality of pixels in the flash image by blending the plurality of pixels in the flash image with pixels from corresponding pixels in the non-flash image;
   the flash artifact removal component being configured to detect edges of features of the one or more eyes in the non-flash image and to detect the plurality of pixels to be replaced in the flash image on the basis of the detected edges.

2. The flash artifact removal apparatus of claim 1 wherein the flash artifact removal component is configured to use the edges to detect at least part of the perimeter of any one or more of: a sclera, an eyelid, a pupil, an iris.

3. The flash artifact removal apparatus of claim 1 wherein the flash artifact removal component is configured to align the flash and non-flash images by aligning a region found from the detected edges with a flash artifact region detected in the flash image.

4. The flash artifact removal apparatus of claim 1 wherein the flash artifact removal component corrects the plurality of pixels in the flash image by replacing them with pixels copied from corresponding pixels in the non-flash image.

5. The flash artifact removal apparatus of claim 1 wherein the flash artifact removal component computes a seam between the replaced pixels and remaining pixels in the flash image, using feathering whereby some but not all pixels along the seam are replaced.

6. The flash artifact removal apparatus of claim 1 wherein the flash artifact removal component uses weighted blending with weights are computed using at least one or more of: a comparison between the flash image and a synthetic flash image computed from the non-flash image, results of the edge detection on the non-flash image.

7. The flash artifact removal apparatus of claim 1 wherein the flash artifact removal component computes a normalization of the non-flash image prior to correcting the flash image.

8. The flash artifact removal apparatus of claim 7 wherein the normalization acts to increase the similarity of the flash and non-flash images.

9. The flash artifact removal apparatus of claim 7 wherein the normalization comprises using a similar range of intensities in a color channel of the non-flash image as found in the flash image.

10. The flash artifact removal apparatus of claim 7 wherein the normalization takes into account parameters of a flash used during capture of the flash image.

11. The flash artifact removal apparatus of claim 7 wherein the normalization takes into account a sensor response of a camera used during capture of the flash image and the non-flash image.

12. The flash artifact removal apparatus of claim 1 wherein the flash artifact removal component computes a measure of signal to noise ratio of the flash image and/or the non-flash image, and wherein the flash artifact removal component adds variance to the corrected flash image on the basis of the measured signal to noise ratio.

13. A camera comprising the flash artifact removal apparatus of claim 1.

14. A flash artifact removal apparatus comprising:
means for storing a flash image depicting a person's face captured in the presence of a flash illumination, and a non-flash image depicting the person's face captured without flash illumination, where a plurality of pixels in the flash image are substantially red, substantially silver or substantially gold as a result of flash light reflecting from one or more eyes of the person; and
means for correcting the plurality of pixels the flash image by blending the plurality of pixels in the flash image with pixels from corresponding pixels the non-flash image;
wherein the means for correcting comprises means for detecting edges of features of the one or more eyes in the non-flash image and detecting the plurality of pixels to be replaced in the flash image on the basis of the detected edges.

15. A camera comprising the flash artifact removal apparatus of claim 14.

16. A computer-implemented method comprising:
storing a flash image depicting a person's face captured in the presence of a flash illumination, and a non-flash image depicting the person's face captured without flash illumination, where a plurality of pixels in the flash image comprise artifacts as a result of flash light reflecting from one or more eyes of the person;
detecting edges of features of the one or more eyes in the non-flash image; and
correcting the plurality of pixels in flash image by blending the plurality of pixels in the flash image with pixels from corresponding pixels from the non-flash image.

17. The method of claim 16 which uses weighted blending where weights computed from image data of the flash and/or non-flash image control relative influence of the flash and non-flash images on the corrected flash image.

18. The method of claim 17 wherein the weights are computed using at least one or more of: a comparison between the flash image and a synthetic flash image computed from the non-flash image, results of edge detection on the non-flash image.

19. The method of claim 17 comprising computing a normalization of the non-flash image prior to correcting the flash image.

20. The method of claim 17 comprising computing a measure of signal to noise ratio of the flash image and/or the non-flash image, and adding variance to the corrected flash image on the basis of the measure of signal to noise ratio.

* * * * *